Aug. 13, 1957  S. M. ABBOTT  2,802,296
BOOK HOLDER AND CARRYING DEVICE
Filed Nov. 2, 1955  3 Sheets-Sheet 1
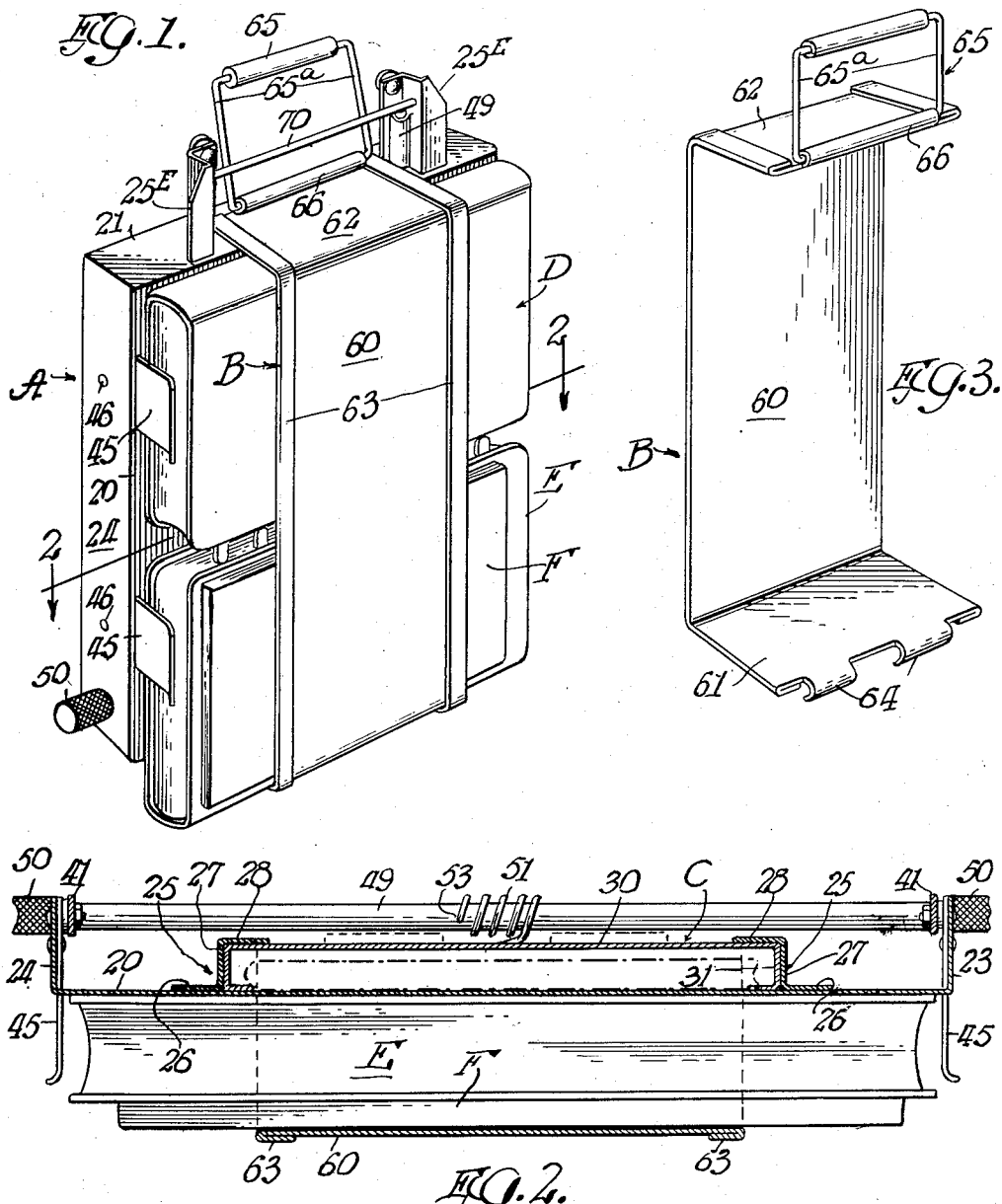

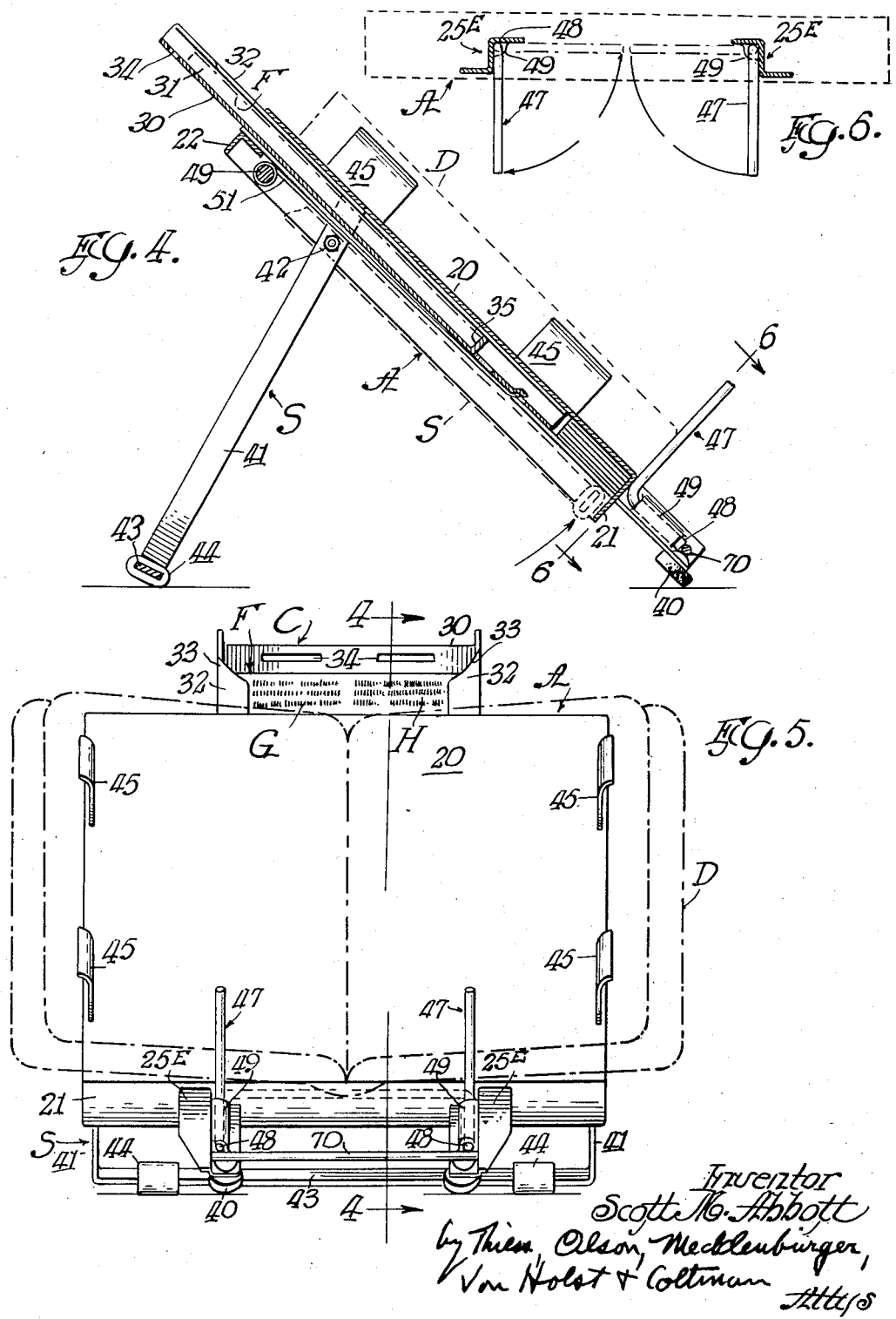

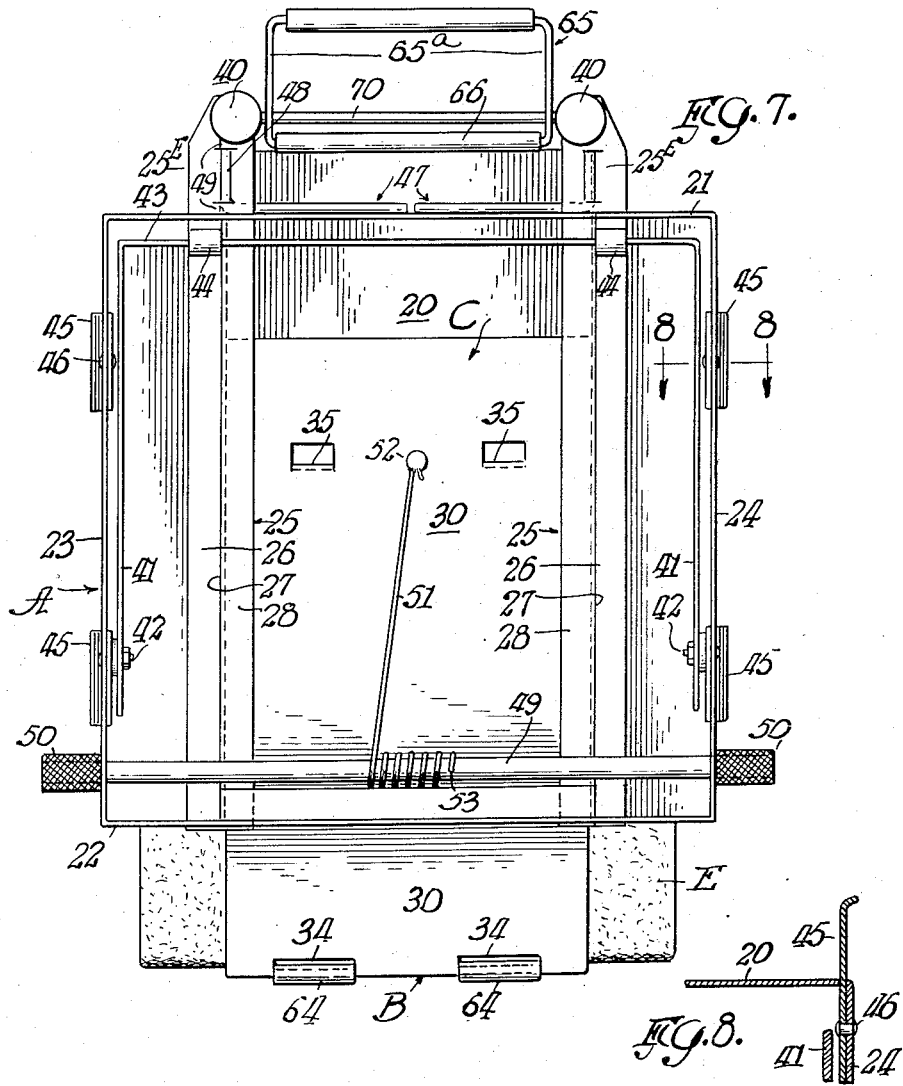
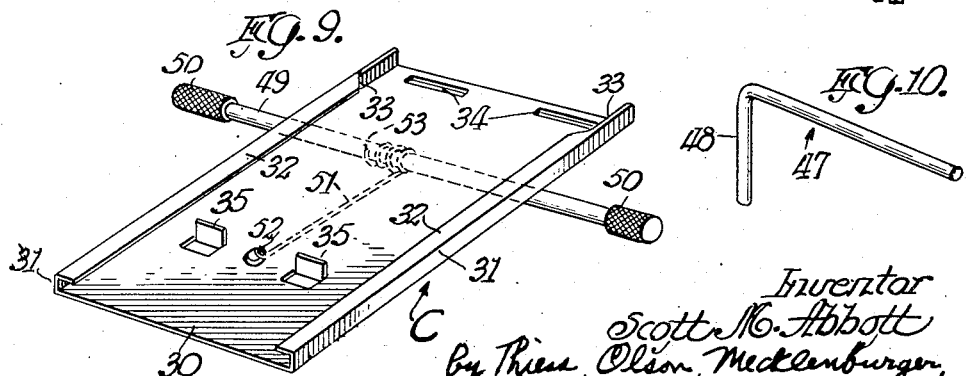

United States Patent Office 2,802,296
Patented Aug. 13, 1957

2,802,296

BOOK HOLDER AND CARRYING DEVICE

Scott M. Abbott, Chicago, Ill.

Application November 2, 1955, Serial No. 544,557

6 Claims. (Cl. 45—80)

The invention relates generally to improvements in book holders and study aids but relates more particularly to means adapted to carry a plurality of books and also to be set up for use in reading portions of one book which makes reference to one or more other books, particular portions of which are to be noted and studied.

As by way of example, Christian Scientists are accustomed to use what is known as a quarterly, which technically is a book and which, in turn, contains references to pertinent parts of the Holy Bible and the work known as Christian Science and Health, parts of which are to be considered and studied together.

Pages of the quarterly have references to portions of the Bible, arranged in a vertical column on one side of the page and pertinent or related parts of Science and Health arranged in a vertical column on the opposite side of the page.

Usually a given group of such references will be studied for a given weekly period, prior to the worship period on the following Sabbath.

The general object of the invention is to provide means which will facilitate study of a subject where one book or pamphlet makes reference to definite portions of several other works or books, which are related to that subject.

Another object of the invention is to provide means of this type which shall be so constructed that the several related books or pamphlets can all be carried conveniently from one place to another intermediate study or use of the several books for study purposes.

Again, it is an object of the invention to provide means for this purpose which shall be compact in character, and which may be easily assembled and disassembled for the purpose of study or transport of the books, as the case may be.

Another object of the invention is to provide structure for this purpose which shall comprise parts adapted to position the apparatus at an inclination well suited for reading and which can also be folded compactly for transport.

The above mentioned objects of the invention, as well as others, together with the several advantages thereof will more fully appear as the specification proceeds to describe the preferred form illustrated in the accompanying drawings, in which—

Fig. 1 is a perspective view of a book holder and study aid embodying the invention, the parts being arranged as a carrying case for transporting several books.

Fig. 2 is a transverse sectional view on the line 2—2 of Fig. 1 but on a larger scale, Fig. 3 is a perspective view of a cover member as though looking at the inner side thereof.

Fig. 4 is a sectional view on the line 4—4 of Fig. 5, certain of the reference books being illustrated by dot and dash lines, Fig. 5 is a front elevation of the structure as set up in Fig. 4, Fig. 6 is a detail fragmentary view on the line 6—6 of Fig. 4, Fig. 7 is a rear elevation of the device with the parts arranged as a holder for transporting books, as shown in Fig. 1, but on a larger scale, Fig. 8 is a fragmentary sectional view on the line 8—8 of Fig. 7, Fig. 9 is a perspective view of a carriage member slidable in the holder together with means for manipulating it; and Fig. 10 is a perspective view of one of two members mounted for swinging movement, from book-supporting position, shown in full lines in Figs. 4, 5 and 6, to collapsed position, shown by the dot and dash lines in Fig. 6.

As shown in the drawings, the book holder and study aid comprises two general parts, to wit: a body structure A and a cover B.

The body structure A comprises a pan-like structure, including a generally rectangular face plate 20, rearwardly from which project flanges 21, 22, 23 and 24.

On the rear face of the plate 20 is a pair of spaced parallel Z bars 25—25, the flange portions 26 thereof being fixed to the plate 20, the web portions 27 extending away from the plate and the flange portions 28 being arranged in spaced and parallel relation to the rear face of plate 20. The two Z bars 25—25 form rails or ways for guiding the carriage C (shown separately in Fig. 9) longitudinally of the members 25—25.

*Carriage C structure and operation*

Carriage C comprises a plate portion 30 of generally rectangular shape, bounded along two margins by portions 31—31, which extend at right angles to the plate 30, the portions 31—31 terminating in flanges 32—32 which overhang the upper surface of the plate 30.

The flanges 32—32 of the carriage C are cut back at one end as indicated at 33—33, the purpose of which will shortly appear. Also, elongated slots 34—34 are provided at one end of the plate 30 and projecting tabs 35—35 are struck up from the plate 30 adjacent the opposite end. The purpose of these features will be described later.

*Other structural features*

The Z bars 25—25 of the body structure A project beyond that end of the body which is the lower end when the device is set up for study purposes, as shown in Figs. 4 and 5, but which is the upper end when the device is arranged for book-carrying purposes as shown in Figs. 1 and 7. To these end portions 25E—25E there are attached pads 40—40 for engagement with the surface on which the device is supported for use.

For supporting the structure at the desired angle for reading there is provided a support S of U-shape formation, end portions of the legs 41—41 thereof being pivotally attached at 42—42 to adjacent flange portions 23—24 of the body A. The cross bar 43 of the support S is provided with resilient members 44—44 for engagement with the supporting surface as is best shown in Fig. 4.

Along each of two sides of the body structure A is a pair of projecting members 45—45, the lower ends of which are secured in any suitable manner, as for example by rivets 46, to the flanges of the body structure.

For supporting the book or books which rest on the body structure when set up for reading and study, a pair of L-shaped rods 47 are provided. One leg 48 is mounted for partial rotation in a sleeve-like portion 49 formed in the projecting lower end portion of the Z bar. This permits rotation of the rods 47 between the position shown in full lines in Figs. 4, 5 and 6 and that shown in dotted lines in Figs. 5 and 6.

For actuating the carriage C there is provided a transverse shaft 49 which projects though and is mounted for rotation in the flanges 23 and 24 of the body A. Members 50 are provided at opposite ends of the shaft which may be engaged by the fingers for imparting rotation to the shaft and which also hold the shaft against shifting movement in the direction of the shaft axis.

A strand or cord 51 has one end thereof fixed to the carriage at 52 while the other end is fixed to the shaft 49 at 53.

It is clear that when the device is set up in the position shown in Fig. 4, rotation of the shaft 49 in one direction will cause the strand 51 to be wound upon the shaft and hence move the carriage upwardly. By reversing the direction of shaft rotation the strand will be paid out, thereby permitting the carriage to slide downwardly by gravity.

Construction of cover B

The cover member B is constructed of sheet material, preferably metal. It is generally of U-shape, comprising an elongated generally rectangular body portion 60 and end leg portions 61 and 62. Marginal portions 63—63 are folded back on the outer faces of the body and leg portions and serve to rigidify the cover member and also to enhance its appearance.

The leg portion 61 is provided with a pair of curved hook portions 64 for engagement with the slots 34 of the carriage C.

The other end portion 62 is provided with a handle 65 mounted for swinging movement in a rolled over portion 66 of the end 62.

It is believed the remaining features will be sufficiently understood by giving a description of the manner in which the device is used.

Description of use

To set the device up for use, the cover B is removed and the books marked D, E and F removed from the carrying position shown in Fig. 1. The support S is then swung to the position shown in Fig. 4, which positions the body portion A at an inclination. The members 47 are then swung from the dotted position to the full line position. One of the books, for example, book D, which may be the Bible, is placed on the outer face of the body A, as indicated by dot and dash lines in Figs. 5 and 6. The members 47 then act to prevent the book from sliding downwardly.

The user also inserts the book F, which for example may be a Christian Science quarterly, in the carriage C as indicated by dot and dash lines in Fig. 4, the upstanding tabs 35—35 of the carriage preventing the book F from sliding downwardly beyond that point. It will be understood the book F will be one having references to one or more other books which are placed on the device when arranged for reading and study, as shown in Fig. 4. Hence, the book F will be opened and being flexible, the covers thereof can be folded back so as to expose the desired page, as shown in Fig. 5. As shown, there are two parallel columns marked G and H. Column G, for example, may contain a series of lines having indicia making reference to certain portions of the Bible. Column H may contain a series of lines having indicia making reference to certain portions of book E, for example Christian Science and Health which it is desirable be read and studied in connection with a group of references to the Bible in column G.

By rotating shaft 49 the carriage C can be moved to expose line by line the various references in the two columns G and H.

One convenient way to use the device is to place the Bible in the position shown in dot-dash lines (Fig. 5) and then move the carriage C upwardly exposing the Bible references a line at a time; locating and reading the Bible reference and so proceeding until all Bible references for a given lesson have been exposed and the Bible passages read and studied. The carriage can then be lowered to such position as to expose the first line of column H, of that group of related references in Christian Science and Health. If desired, the Bible can remain in position on the device and the book Christian Science and Health open and placed to rest upon the previously open Bible. The user can then move the carriage, as before explained, to expose the line by line references in column H, the reader turning from time to time to those passages in book F, to which reference is made.

From the foregoing it can be seen that the invention facilitates the reading and study of one or more books in which one book contains references to passages in the other book or books which should be read and studied together.

The invention also provides means for conveniently carrying the study book from place to place. For this purpose the book F is removed from carriage C, the latter being then moved inwardly so that the slots 34—34 therein are closely adjacent one end of the body but still exposed. The members 47—47 can then be swung to the dotted line position (Figs. 5 and 6) and the supporting member S swung to the dotted line position (Fig. 4), being the full line position as shown in Fig. 7.

The structure A with the carriage C thereon may then be arranged in a horizontal position, and the books D, E, and F placed thereon. Thereafter the cover B may be applied. This is done by turning the cover B so that the inner surface faces upwardly, then inserting the curved hooked portions 64—64 into the slots 34—34 of the carriage C and thereafter swinging the cover B, on the hinge thus formed, until the cover handle 65 passes between the adjacent flange of structure A and the cross rod 70. The rod 70 extends between and is fixed in the extending portions of the members 27—27. It should be understood that in order to permit the handle 65 to move to the position shown in Fig. 1, relative to the other parts, it will first be swung to a position in which it extends away from the cover portion 62 in the same general plane, and thereafter swung substantially, but not quite, to a position at right angles thereto, as shown in Fig. 1. Hence, when the whole device, with the books assembled thereon, as in Fig. 1, is lifted by the handle the slide portions 65a—65a of the handle 65 will bear against the cross rod 70 and act to clamp the cover firmly against the books. Hence, when the parts are so arranged the books may be conveniently carried from place to place.

To set the device up for use it is only necessary to reverse the process.

I claim:

1. A combination holder and carrying device for books comprising a means providing structure to act as a support for one or more books, means providing a carriage to hold a book for movement therewith, and means supporting the carriage from and for desired sliding movement relative to said structure in such position that the book held by the carriage is hidden from view, at least in part, by the book or books supported by said structure, additional portions of the book on the carriage being exposed to view when the carriage is moved in one direction relative to said structure.

2. A combination holder and carrying device for books comprising a means providing structure to act as a support for one or more books, means providing a carriage to hold a book for movement therewith, means supporting the carriage from and for sliding movement relative to said structure in such position that the book held by the carriage is hidden from view, at least in part, by the book or books supported by said structure, additional portions of the book on the carriage being exposed to view when the carriage is moved in one direction relative to said structure, and means for moving the carriage in desired increments in at least one direction.

3. A combination holder and carrying device for books comprising a means providing structure to act as a support for one or more books, means providing a carriage to hold a book for movement therewith, means supporting the carriage from and for sliding movement in desired increments relative to said structure in such position that the book held by the carriage is hidden from view, at least in part, by the book or books supported by said structure, additional portions of the hook on the carriage being exposed to view when the carriage is moved in one direction relative to said structure, and means for supporting said structure at an inclination to the horizontal.

4. A combination holder and carrying device for books comprising a means providing structure to act as a support for one or more books, means providing a carriage to hold a book for movement therewith, and means supporting the carriage from and for desired incremental sliding movement relative to said structure in such position that the book held by the carriage is hidden from view, at least in part, by part of said structure, additional portions of the book on the carriage being exposed to view when the carriage is moved in one direction relative to said structure.

5. The arrangement set forth in claim 4 in which said structure comprises a plate member having downwardly extending flange portions within the confines of which the said carriage is positioned.

6. A combination holder and carrying device for books comprising a means providing structure to act as a support for one or more books, means providing a carriage to hold a book for movement therewith, and means supporting the carriage from and for sliding movement in desired increments relative to said structure in such position that the book held by the carriage is hidden from view, at least in part, by the book or books supported by said structure, additional portions of the book on the carriage being exposed to view when the carriage is moved in one direction relative to said structure, said book supporting means of said structure including arms at one end of the structure swingable between a position substantially parallel with said structure and one extending at an angle thereto.

References Cited in the file of this patent

UNITED STATES PATENTS

| | | |
|---|---|---|
| 340,596 | Mowat | Apr. 27, 1886 |
| 1,116,016 | Cochran | Nov. 3, 1914 |
| 1,281,776 | Graham | Oct. 15, 1918 |
| 1,810,205 | Gensmer | June 16, 1931 |
| 1,841,741 | Labadie | Jan. 19, 1932 |
| 2,226,773 | Johnson | Dec. 31, 1940 |
| 2,271,348 | Sampson | Jan. 27, 1942 |